UNITED STATES PATENT OFFICE 2,299,032

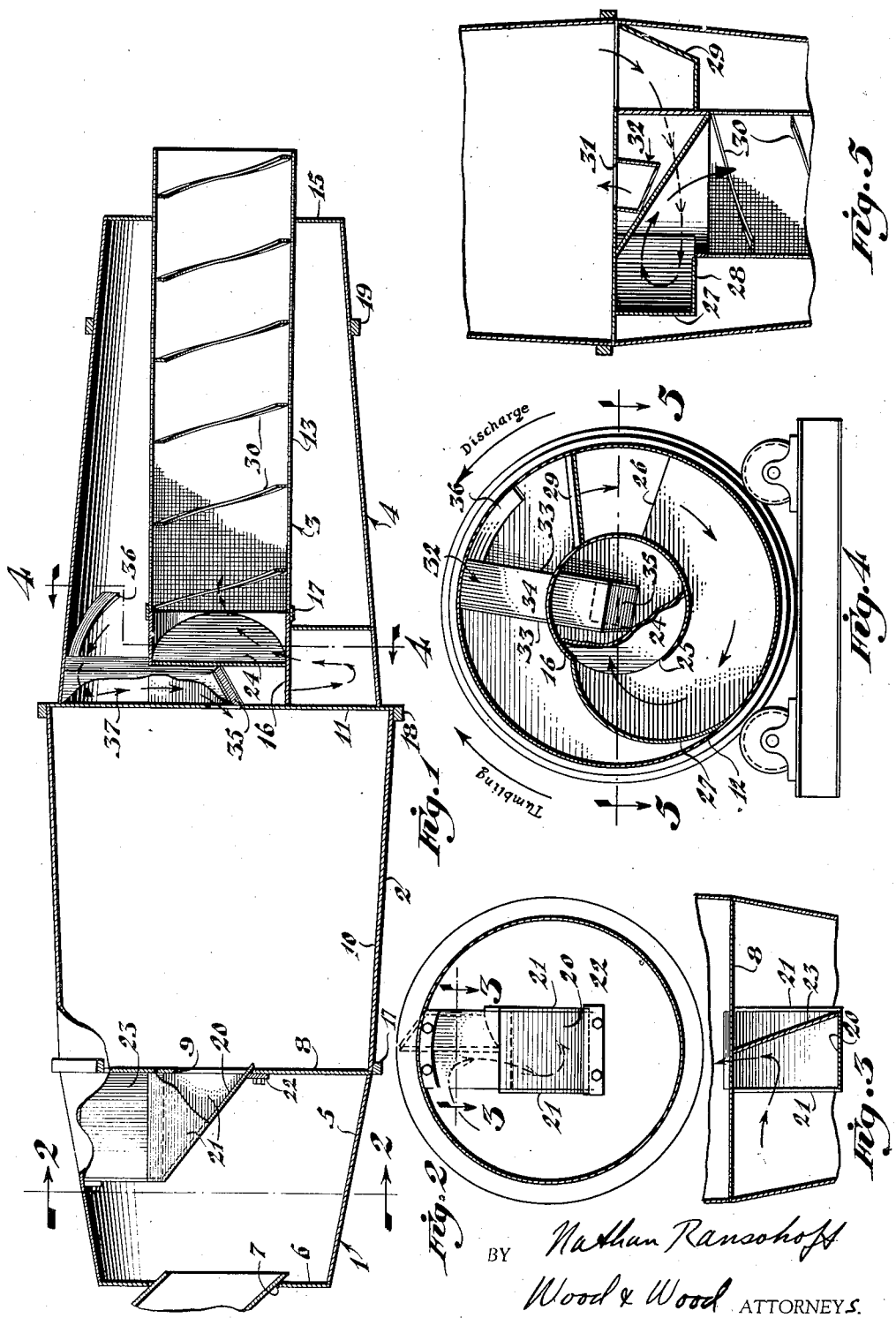

END LOADING TUMBLING MILL

Nathan Ransohoff, Cincinnati, Ohio

Application August 3, 1940, Serial No. 350,895

4 Claims. (Cl. 51—164)

This invention relates to tumbling machines of the type adapted to be used for cleaning metal parts by the use of abrasive metal fragments such as star or disc shaped pieces, slugs, or the like. In the operation of such machine the parts which are to be cleaned, for instance castings carrying sand, grease or dirt, are put into a tumbling cylinder of the machine with the abrasive particles, and the two masses, the parts and the particles, are agitated together therein so as to enable the abrasive particles to contact the metal parts and thereby abrasively remove the dirt from them. After the cleaning operation it is necessary that the abrading elements be separated from the cleaned materials in order that the former can be recovered for further usage and the latter removed from the machine free of contaminations.

The primary object of the present invention has been to provide a tumbling mill which includes means for automatically loading or discharging the tumbling chamber of the mill depending on the direction of rotation of the mill.

It has been a further object of the present inventor to provide a means for loading work into the tumbling chamber of mills of this general type which embodies the advantages of quick loading and large capacity. Heretofore, this type of mill has been loaded through a large central opening in the end wall of the tumbling chamber. The large opening, naturally, limited the load level of the tumbling chamber. Yet, it was found to be more expedient to increase the size of the tumbling chamber in order to increase the load capacity than it was to decrease the size of the loading opening. This is because of the speed and ease of loading through a large opening.

A further object of the invention is to provide apparatus at the end of the tumbling mill opposite the loading end for effecting automatic discharge of parts from the tumbler, and separation of the abrading elements from the parts more efficiently and quickly than in any of the tumbling mills which heretofore have been available.

Briefly, the machines of the present improvement comprise a tumbling chamber in which the principal cleaning operation is performed, a screening chamber in which the separation of the cleaned parts from the abrasive particles takes place, and a collector for recovering the abrasive particles; the collector surrounds the screen and the two are located at one end of the tumbling barrel opposite the loading cone. The loading cone, the tumbling barrel, the screen and the collector drum are all substantially coaxial with one another and rotate as a unit.

The loading cone is in communication with the tumbling barrel through a chute and passageway arrangement. In the preferred embodiment, the chute is comprised of a box-like member having a bottom wall which slopes toward a passageway in the end of the tumbling barrel and a deflector plate or vane is installed angularly across the box so as to pick up material contained in the loading cone, direct it to the chute, thence into the tumbling portion of the apparatus. This assembly operates to convey parts from the loading cone to the tumbler in either direction of rotation of the mill.

The endwise membrane of the tumbling barrel at the end of it opposite the loading cone contains marginal opening of substantial size through which parts and particles are discharged from the tumbling chamber to the screening chamber, and a central opening of somewhat small size through which abrasive particles or stars or slugs are returned to the tumbling chamber as subsequently described. The discharge opening is offset from the axis of the barrel and is accessible from the periphery of the tumbling barrel. Two chutes are provided to cooperate with the two openings in the endwise membrane. One of these passes from the offset discharge opening through the collector drum and into the screen separator. This passageway provides for the discharge of materials from the tumbler to the screen separator. The other passageway extends from the central opening in the endwise membrane to the collector drum and provides for the return of abrading elements from the collector drum thereto.

The two chutes, the one for the return of abrasive particles from the collector ring to the tumbler, and the other for the discharge and conveyance of parts and particles from the tumbler to the screen are of reverse directions, that is, when the machine is operating in one direction, for instance counter-clockwise, the discharge chute is operable to convey parts from the tumbler to the screen and the star return chute is not effective and in the opposite direction the star return chute is operative and the discharge chute is not effective.

Further objects of the invention, and its practical advantages are disclosed in the following description of the drawings, in which a preferred embodiment of the improvement is illustrated.

In the drawing:

Figure 1 is a sectional elevation taken longitudinally through the machine.

Figure 2 is a cross-sectional view through the reservoir of the machine, taken on the line 2—2 of Figure 1.

Figure 3 is a fragmentary sectional view taken on the line 3—3 of Figure 2 and shows the arrangement of the oblique deflector plate in the conveyor box at the reservoir end of the machine.

Figure 4 is a cross-sectional view taken on the line 4—4 of Figure 1.

Figure 5 is a fragmentary, longitudinal section taken on the line 5—5 of Figure 4, to illustrate the oblique deflector plate.

In the tumbling mill disclosed in the drawing, the loading cone or chamber is indicated generally at 1, the tumbling chamber at 2, the screening chamber at 3, and the collector chamber at 4. The loading cone is comprised of a conical annular wall 5, containing an outer end wall 6 which is provided with an aperture 7. A chute or hopper discharge extends through the aperture 7 to facilitate loading. The conical annular wall slopes toward the end wall 8 of the tumbling barrel, and the latter contains a centrally located opening 9.

The opening 7 is substantially large to facilitate loading, while the opening 9 is substantially smaller to increase the possible load level in the tumbling chamber. The loading cone has the additional purpose of preventing parts being tumbled from interfering with the charging chute.

At the tumbling barrel wall 10 also is of conical form, and it, in turn, is of largest diameter at the end wall 11, which is opposite the loading cone. Both ends of the tumbling barrel are flat and without obstructions; consequently, there is lesser wear on the machine and a smoother tumbling action is obtained.

At the collector drum 4, wall 12 is also of cone form, the drum being of largest diameter adjacent the wall 11. Screening drum 3 resides within the collector drum and it is comprised of a cylinder 13, having screening openings in its periphery.

The outer end of the collector drum is closed by an annular wall 15, which extends from the wall 12, to the wall 13 of the screen cylinder, and at the inner end, a collar indicated generally at 16, is interposed between the membrane 11 and the interior end of the screen drum 3. The collar 16 is preferably a solid wall member while the screen 13 contains openings or apertures of the size sufficient to permit the passage of abrading elements therethrough. All of the drums are substantially coaxial with one another and are fastened together as by welding so as to rotate as a unit.

The drive apparatus by which the machine is rotated, is of a conventional type and has not been illustrated in detail; those skilled in the art will readily understand the construction of it. The rings 17, 18, and 19 extend about the drum at spaced intervals and provide tracks upon which the apparatus rotatably may be supported and drive apparatus is provided to operate the machine in either direction of rotation.

*Loading chamber*

A chute plate 20 extends obliquely into the loading chamber 1 from the aperture 9, in the head 8 and wall plates 21 are provided at both sides of it, while the bottom, at the point adjacent the entrance of the plate into the aperture is stiffened by a cross piece 22, appropriately bolted to the end membrane 8 of the tumbling chamber. The side plates 21 of the chute box extend above the chute plate 20, but the upper edges of them are spaced inwardly from the periphery of the wall 5 of the reservoir chamber to provide for access of parts from the reservoir to the chute. A vane 23 extends obliquely across the open face of the chute box; this is, for instance, from an intermediate point at the one side on an angle toward an outer corner at the other side, as shown in Figure 3. The lower edge of this vane extends slightly below the upper edges of side walls 21, and the outer edge of it is in engagement with the periphery of the cylinder wall 5. This vane has the function of directing parts from the reservoir into the chute, and of preventing the return of parts from the separator back into the passageway.

By virtue of the slope of the cylinder wall 5 toward the end membrane 8, the parts and abrading elements discharged into the reservoir container are caused to gravitate toward the endwise membrane 8, in which position they are picked up by the vane 23 and therefore directed to the chute box for conveyance into the tumbling chamber. The vane 8 is obliquely disposed so as to be more efficient in the one direction of rotation, which we may call the "tumbling" direction than in the reverse direction. However, if the direction of rotation be reversed, any parts contacting the vane also will be elevated by the vane and likewise caused to drop into the box before they are deflected back into the reservoir chamber proper. Through this arrangement, materials contained in the reservoir can be moved into the tumbler in either direction of rotation. The advantage of this construction is explained at a later point in the specification in conjunction with the operation of the other elements of the machine.

*Discharge from tumbler to separator*

The ring or collar 16, which is connected to the screening cylinder 13 by means of a band 17, contains a vane 24 extending obliquely across it. For instance the inner edge of the vane at the one side resides adjacent the end wall 11, and the outer edge of the vane at the opposite side resides adjacent the end of the collar.

At a point on the periphery of the collar 16, which is endwisely beyond the oblique vane 24, an aperture 25 is provided in the collar periphery. For cooperation with this opening an aperture 26 is also provided in the end membrane 11 of the tumbling chamber. Aperture 26 is offset from the axis of the chamber and is accessible from the peripheral wall 10, as shown in Figures 4 and 5 and both openings are of sufficient size to permit the parts to be cleaned free to pass through them.

Scoop 27, end wall member 28 and another vane member 29 adjacent the aperture 26 define a passageway or conduit interconnecting the two openings, 25 and 26. More specifically, the scoop 27 is a convolute member extending from the wall 16 to the wall 12 of the collector drum; this scoop provides a gradual ramp across which parts are free to move during rotation of the drum. The vane 29 extends from an edge of the aperture 26, opposite the scoop, and in a direction oblique to the end wall 11 of the tumbling chamber. Both the scoop and the vane 29 extend laterally from the end wall 11, and the outer edges of them are joined together by the wall member 28.

The scoop 27 is radially offset from the vane 29 so that the ramp defined by the scoop is of relatively gradual slope. Vane 29 is positioned at the one side of the aperture 26, and the scoop 27 extends from the relatively opposite side of the aperture 25, and together, in conjunction with the end wall 28, these members provide an elevator for conveying parts and abrading elements from the tumbling chamber, which is of relatively large diameter, to the screening member which is of relatively small diameter.

Within the screen a spiral conveyer 30 is provided. This member is of the usual form and constitutes a vane for moving parts caught therein toward the discharge end of the screening cylinder as indicated by the directional arrow shown in Figure 1. As the parts and abrading elements pass through the screen, the abrading elements drop through the apertures and are separated from the clinging parts. The latter are collected as they emerge from the end of the screen.

*Abrading element return*

The passageway delineated by the scoop 27, the vane 29, and the wall member 28 resides within the collector drum, but is not in communication with it. However, the collector drum, at a location somewhat offset from the scoop and vane members, contains another scoop for conveying the abrading elements back into the tumbling chamber and this apparatus briefly is as follows:

Wall 11 contains a central aperture 31. A chute box, indicated generally at 32 communicates with this aperture, passing through an opening in the ring 16 which is located interior of the oblique membrane 24. The chute 32 extends outwardly into the collector drum and has an opening adjacent the periphery into which abrading elements may pass for discharge through the chute into the tumbling chamber.

The chute box 32 is comprised of side wall members 33, a face wall 34, and an inner end wall 35. The latter is on a slant so that any particles passing through the box are deflected out through the opening 31. This box is fastened to the end wall 11 and, adjacent the opening in one of the walls 33, a vane 36 is provided to direct abroading elements toward the opening in the box. The vane 36 is fastened to the wall 12 of the collector cylinder, and the path of particles caught in the vane is shown digrammatically by the arrows 37 of Figure 1.

The two scoop passageways constituted by the abrading element return on the one hand, and the discharge passageway on the other, are arranged to operate in respectively opposite directions of rotation of the machine. Therefore, no discharge takes place from the tumbling chamber when abrading elements are being returned to it, and vice versa, no return of abrading elements to the tumbling chamber takes place when parts are being discharged from the tumbling chamber while the machine is being rotated in an opposite direction.

The vane 29 is positioned to operate as a collector vane when the machine is operated in the tumbling direction of rotation, and at this time, the scoop 27 "follows" the direction of rotation and it is therefore not operable. Consequently, and parts falling through the aperture 26 during tumbling operations are re-collected by the vane, and thus returned through the tumbling cylinder.

It was mentioned previously that the chute conveyer in the loading cone was operable in either direction of rotation. The advantage of this arrangement is that it provides a means for returning any parts being cleaned to the tumbling chamber if they happen to fall through the opening between the tumbling chamber and the loading cone when the direction of rotation is changed to discharge the tumbling chamber.

The time consumed in returning the abrading elements to the tumbling cylinder also may be employed for effecting the loading of the tumbling cylinder with the next successive batch of dirty parts.

*Operation of the machine*

In the normal operation of the machine, for instance, when it is used for the first time, a batch of parts to be cleaned is introduced into the loading chamber, and, at the same time, an appropriate supply of abrading elements is charged therein. The machine is then rotated in "tumbling" direction. The parts in the storage reservoir gravitate toward the end wall 8 and are directed into the chute box, thence into the tumbling chamber by the vane 23. The machine is operated until all of the parts have been removed from the loading cone to the tumbler and cleaned therein.

When this tumbling operation is completed, the direction of the machine is reversed to "discharge." The parts now pass out through the aperture 26 and are caught by the scoop 25 and directed to the screening cylinder, being deflected into the cylinder by the vane 24 as they emerge through the aperture 25 in the collar 16. Entering the separator chamber, the parts and particles are caught by the vane 30 and advanced therethrough, with the abrading elements dropping from the separator screen into the collector drum. This operation is continued until all of the cleaned parts have been discharged from the tumbling chamber and have passed out through the screen. At such time, all of the abrading elements have been collected in the drum 4. Thus no parts or cleaning particles are retained in the loading cone from operation to operation.

The machine is now caused again to rotate in the "tumbling" direction, whereby the vane 36 is rendered effective as a scoop to collect the particles, and advance them to the opening in the chute box 34 through which they will return to the tumbling chamber. Simultaneously with this operation, as previously described, another batch of dirty parts may be discharged into the storage reservoir, but if this is done, it is not necessary to also introduce another batch of the abrasive particles since the material previously used will be available.

Having described my invention, I claim:

1. A tumbling mill comprising a tumbling barrel, having an opening in an end thereof which is offset from the axis of the barrel, a screening separator extending beyond the end of the said barrel of the tumbling barrel, a collector drum surrounding the screening separator, the screening drum, the collector drum, and the tumbling barrel being rotatable as a unit, means intermediate said collector drum and said screening separator defining a passageway including a ramp of generally cycloidal shape extending from said offset opening to said screening separator, and a vane extending obliquely across said screening separator for directing materials coming from said ramp into said separator, the said end of said tumbling barrel having another opening therein which is substantially in alignment with said screening separator, means for directing abrading elements from said collector drum to the tumbling barrel through said opening, a loading cone at an end of said tumbling barrel opposite said screening separator, and means in said loading cone for discharging materials into said tumbling barrel.

2. A tumbling mill comprising a tumbling barrel, having a discharge opening in an end thereof which is offset from the axis of the barrel, a screening separator extending beyond the end of the said tumbling barrel, a collector drum surrounding the screening separator, the screening drum, the collector drum, and the tumbling barrel being rotatable as a unit, chute means including a ramp of generally cycloidal shape, said chute means defining a passageway extending from said offset opening to said screening separator, and a vane extending obviously across said screening separator adjacent the end of said ramp for directing materials coming through said passageway into said separator, the said end of said tumbling barrel having another opening therein which is substantially in alignment with said screening separator, and means for directing abrading elements from said collector drum to the tumbling barrel through said other opening.

3. A tumbling mill comprising a tumbling barrel, having an opening in an end thereof, a screening separator extending beyond the end of the said barrel of the tumbling barrel, a collector drum surrounding the screening separator, the screening drum, the collector drum, and the tumbler being rotatable as a unit, means intermediate said collector drum and said screening separator defining a passageway from said opening in said tumbling barrel to said screening separator, said passageway terminating in a vane extending obliquely in said screening separator for directing materials coming through said passageway into said separator, and preventing the return thereof, the said end of said tumbling barrel having another opening therein which is substantially in alignment with said screening separator, and means for directing abrading elements from said collector drum to the tumbling barrel through said other opening, the said mill being adapted to discharge to said offset opening into the screening separator when it is rotated in one direction and adapted to cause the return of abrading elements from the collector drum through the other said opening when it is rotated in the opposite direction, means at the other end of the tumbling chamber constituting a loading chamber and means for conveying parts from the loading chamber to the tumbling chamber in either direction of mill rotation.

4. In a tumbling mill, a tumbling barrel having an end wall, a collar extending from said end wall, a screening drum extending from said collar and being axially aligned with said tumbling barrel, a collector drum extending around said screening drum, said end wall of the tumbling barrel having an opening therein adjacent the peripheral wall of the barrel and said collar having an opening therein at a point adjacent the screening drum, means including a ramp of generally cycloidal shape constituting a passageway interconnecting the opening in the said end wall with the opening in the collar, for delivery of articles from the tumbling barrel to the screening drum, a vane member extending obliquely across the collar at a point adjacent said opening therein, to deflect articles coming through said passageway into the screening drum, the said end wall of the tumbling barrel also having a central opening therein which is obstructed from communication with said screening drum by said oblique vane, and partition means constituting a passageway interconnecting said central opening with said collector drum for delivery of articles from the collector drum to the tumbling chamber.

NATHAN RANSOHOFF.

CERTIFICATE OF CORRECTION.

Patent No. 2,299,032.                                  October 13, 1942.

NATHAN RANSOHOFF.

It is hereby certified that error appears in the printed specification of the above numbered patent requiring correction as follows: Page 3, first column, line 50, for "abroading" read --abrading--; line 72, for "and" before "parts" read --any--; page 4, first column, line 22, claim 2, for the word "obviously" read --obliquely--; and that the said Letters Patent should be read with this correction therein that the same may conform to the record of the case in the Patent Office.

Signed and sealed this 17th day of November, A. D. 1942.

(Seal)

Henry Van Arsdale,
Acting Commissioner of Patents.